(12) United States Patent
Nirantare et al.

(10) Patent No.: US 9,979,205 B2
(45) Date of Patent: May 22, 2018

(54) METHODS AND CIRCUITS CONFIGURED TO PROVIDE FOR MULTI-PHASE WIRELESS POWER TRANSFER

(71) Applicant: Eaton Capital Unlimited Company, Dublin (IE)

(72) Inventors: Prasanna Sharadchandra Nirantare, Pune (IN); Birger Pahl, Milwaukee, WI (US)

(73) Assignee: Eaton Capital Unlimited Company, Dublin (IE)

( * ) Notice: Subject to any disclaimer, the term of this patent is extended or adjusted under 35 U.S.C. 154(b) by 245 days.

(21) Appl. No.: 14/829,153

(22) Filed: Aug. 18, 2015

(65) Prior Publication Data
US 2017/0054302 A1    Feb. 23, 2017

(51) Int. Cl.
| H02J 5/00 | (2016.01) |
| B60L 11/00 | (2006.01) |
| H02J 50/10 | (2016.01) |
| H01F 38/14 | (2006.01) |
| H02J 50/40 | (2016.01) |

(52) U.S. Cl.
CPC ............ *H02J 5/005* (2013.01); *B60L 11/00* (2013.01); *H02J 50/10* (2016.02); *H01F 38/14* (2013.01); *H02J 50/40* (2016.02)

(58) Field of Classification Search
CPC ................................. H02J 5/005; H02J 50/10
USPC ......................................................... 307/104
See application file for complete search history.

(56) References Cited

U.S. PATENT DOCUMENTS

| 2,568,169 A | 9/1951 | Raczynski |
| 3,484,727 A | 12/1969 | Weber et al. |
| 4,471,335 A | 9/1984 | Moritz et al. |
| 6,060,875 A | 5/2000 | Capici et al. |
| 6,198,375 B1 | 3/2001 | Shafer |
| 7,411,479 B2 | 8/2008 | Baarman et al. |
| 7,495,414 B2 | 2/2009 | Hui |
| 7,554,430 B2 | 6/2009 | Mehrotra et al. |
| 7,639,110 B2 | 12/2009 | Baarman et al. |
| 8,138,875 B2 | 3/2012 | Baarman et al. |
| 8,380,998 B2 | 2/2013 | Azancot et al. |

(Continued)

FOREIGN PATENT DOCUMENTS

| CN | 202309183 U | 7/2012 |
| CN | 202444333 U | 9/2012 |

(Continued)

OTHER PUBLICATIONS

Braun Toothbrush Teardown, Published on May 29, 2012, EEVblog #284, Retrieved from the Internet at URL https://www.youtube.com/watch?v=JJgKfTW53uo.

(Continued)

*Primary Examiner* — John Poos
(74) *Attorney, Agent, or Firm* — Ward and Smith, P.A.

(57) ABSTRACT

A method of providing wireless power transfer can include receiving multi-phase power at a transmitter portion of a multi-phase wireless power transfer system that is associated with an electrical equipment rack that is configured to house a plurality of electrical components and wirelessly transferring the multi-phase power from the transmitter portion to a receiver portion of the multi-phase wireless power transfer system at a power level that is configured to operate the plurality of electrical components.

26 Claims, 14 Drawing Sheets

(56) References Cited

U.S. PATENT DOCUMENTS

| | | |
|---|---|---|
| 8,531,059 B2 | 9/2013 | Ichikawa et al. |
| 8,669,678 B2 | 3/2014 | Urano |
| 8,698,350 B2 | 4/2014 | Kanno |
| 8,742,625 B2 * | 6/2014 | Baarman ................. H02J 5/005 307/104 |
| 2006/0049907 A1 | 3/2006 | Liu |
| 2007/0007935 A1 | 1/2007 | Johnson |
| 2008/0265684 A1 * | 10/2008 | Farkas ................. B60L 11/005 307/104 |
| 2010/0314947 A1 | 12/2010 | Baarman et al. |
| 2011/0049997 A1 | 3/2011 | Urano |
| 2011/0080053 A1 | 4/2011 | Urano |
| 2011/0127846 A1 | 6/2011 | Urano |
| 2011/0163542 A1 | 7/2011 | Farkas |
| 2012/0043825 A1 | 2/2012 | Urano |
| 2012/0086281 A1 | 4/2012 | Kanno |
| 2012/0112719 A1 | 5/2012 | Xia et al. |
| 2012/0212068 A1 | 8/2012 | Urano |
| 2013/0187625 A1 | 7/2013 | Mao |
| 2013/0249304 A1 | 9/2013 | Keeling et al. |
| 2013/0249479 A1 | 9/2013 | Partovi |
| 2014/0049118 A1 | 2/2014 | Karalis et al. |

FOREIGN PATENT DOCUMENTS

| | | |
|---|---|---|
| EP | 2 868 492 A1 | 5/2015 |
| GB | 1134208 | 2/1966 |
| JP | 2006-271027 A | 10/2006 |
| WO | WO 02/25677 A2 | 3/2002 |
| WO | WO 2012/046453 A1 | 4/2012 |
| WO | WO 2013/111243 A1 | 8/2013 |

OTHER PUBLICATIONS

Chen, Qingbin et al., "The New Electric Shielding Scheme with Comb-shaped Wire and its Applications in SMPS"; College of Electrical Engineering and Automation; Fuzhou University; Fuzhou, Fujian, 350108, China; Published in: Telecommunications Energy (INTELEC), 2011 IEEE 33rd International Conference; Oct. 9-13, 2011; ISSN: 2158-5210; 7 pages.

Duong et al. "Experimental Results of High-Efficiency Resonant Coupling Wireless Power Transfer Using a Variable Coupling Method", *IEEE Microwave and Wireless Components Letters*, vol. 21, No. 8, Aug. 2011, 3 pages.

International Search Report and Written Opinion Corresponding to International Application No. PCT/US2014/072667; dated Mar. 25, 2015; 9 Pages.

Nair et al. "Efficiency Enhanced Magnetic Resonance Wireless Power Transfer System and High Voltage Integrated Chip Power Recovery Scheme", *IEEE CONECCT 2014*, Jan. 6-7, 2014.

U.S. Appl. No. 14/579,007, Xu et al., *Wireless Power Transfer Apparatus and Power Supplies Including Overlapping Magnetic Cores*, filed Dec. 22, 2014.

U.S. Appl. No. 14/590,452, Nirantare et al., *Methods, Circuits and Articles of Manufacture for Controlling Wireless Power Transfer Responsive to Controller*, filed Jan. 6, 2015.

U.S. Appl. No. 14/143,505, Wu et al., "Methods, Circuits And Articles Of Manufacture For Configuring DC Output Filter Circuits" filed Dec. 30, 2013.

U.S. Appl. No. 14/323,436, Nirantare et al., "Wireless Power Transfer Systems Using Load Feedback" filed Jul. 3, 2014.

International Search Report and Written Opinion Corresponding to International Application No. PCT/US2016/047308; dated Nov. 16, 2016; 10 Pages.

* cited by examiner

METHODS AND CIRCUITS CONFIGURED TO PROVIDE FOR MULTI-PHASE WIRELESS POWER TRANSFER

FIELD

The present invention relates to the field of power systems, and more particularly, to wireless power transfer.

BACKGROUND

Wireless power transfer systems have been developed for a variety of different applications, including battery charging applications for vehicles, mobile electronic devices, tools, and the like. Such systems can use magnetically coupled resonant circuits to transfer energy. Examples of such wireless power transfer systems are described in U.S. Pat. No. 8,531,059 and U.S. Patent Application Publication No. 2013/0249479.

An example of control of a wireless power transfer system is described in U.S. patent application Ser. No. 14/323,436, entitled WIRELESS POWER TRANSFER SYSTEMS USING LOAD FEEDBACK, filed Jul. 3, 2014.

U.S. patent application Ser. No. 14/143,505 entitled METHODS, CIRCUITS AND ARTICLES OF MANUFACTURE FOR CONFIGURING DC OUTPUT FILTER CIRCUITS, filed Dec. 30, 2013, describes wireless power transfer systems having a transmitter including a rectifier that receives power from an AC power source, an inverter circuit that generates a higher frequency AC output voltage from a DC output produced by the rectifier, and a first resonant circuit coupled to an output of the inverter circuit. A receiver includes a second resonant circuit including a coil that is configured to be placed in close proximity to a coil of the first resonant circuit and a rectifier circuit that produces a DC output from an AC output produced by the second resonant circuit.

FIG. 1A is a block diagram illustrating a power distribution system that may be used in a data center that includes a plurality of racks 100 that are configured to house servers provided with 3-phase power. According to FIG. 1A, 3-phase power is provided to a 3-phase power transformer 120 that provides power, such as 480 VAC 3-phase power, to a UPS system 115. The UPS system 115 is configured to provide power to the servers even if the 480 VAC 3-phase power to the UPS system 115 fails.

The UPS system 115 provides 480 VAC 3-phase power to a power distribution unit (PDU) 105 which is configured to step-down the 3-phase power to a lower power level, such as 208 VAC 3-phase power. It will be understood that the 3-phase power can be provided at a low frequency, such as 50 or 60 Hz. The 208 VAC 3-phase power is provided to the plurality of racks 100 via a branch circuit 110. The branch circuit 110 can be a network of electrical conductors that couple the output of the PDU 105 to all of the racks 100, for example, in parallel.

FIG. 1B is a block diagram that illustrates a server power supply 150 that receives the 208 VAC 3-phase power shown in FIG. 1A over the branch circuit 110. In particular, the 208 VAC 3-phase power can be provided to a 3-phase power factor control circuit 160 in the power supply 150 to generate a DC voltage (such as 380 VDC). The DC voltage can be provided to a DC-DC converter 155 to step-down the DC voltage to a level that may be utilized by the servers housed in the racks 100. It will be understood that each of the servers included in each of the racks 100 can include a version of the server power supply 150, and therefore may be provided with the 208 VAC 3-phase power.

SUMMARY

Embodiments according to the present invention can provide methods and circuits configured to provide multi-phase wireless power transfer. Pursuant to these embodiments, a method of providing wireless power transfer can include receiving multi-phase power at a transmitter portion of a multi-phase wireless power transfer system that is associated with an electrical equipment rack that is configured to house a plurality of electrical components and wirelessly transferring the multi-phase power from the transmitter portion to a receiver portion of the multi-phase wireless power transfer system at a power level that is configured to operate the plurality of electrical components.

In some embodiments, a multi-phase wireless power transfer system can include a transmitter portion of the multi-phase wireless power transfer system associated with an electrical equipment rack that is configured to house a plurality of electrical components, the transmitter portion configured to wirelessly transfer multi-phase power at a power level that is configured to operate the plurality of electrical components.

In some embodiments, a multi-phase wireless power receiver can include a receiver portion of a multi-phase wireless power transfer system, wherein the receiver portion can be associated with an electrical equipment rack that is configured to house a plurality of electrical components, the receiver portion configured to wirelessly receive multi-phase power at a power level that is configured to operate the plurality of electrical components.

DETAILED DESCRIPTION OF EMBODIMENTS ACCORDING TO THE INVENTION

Figure 1A:
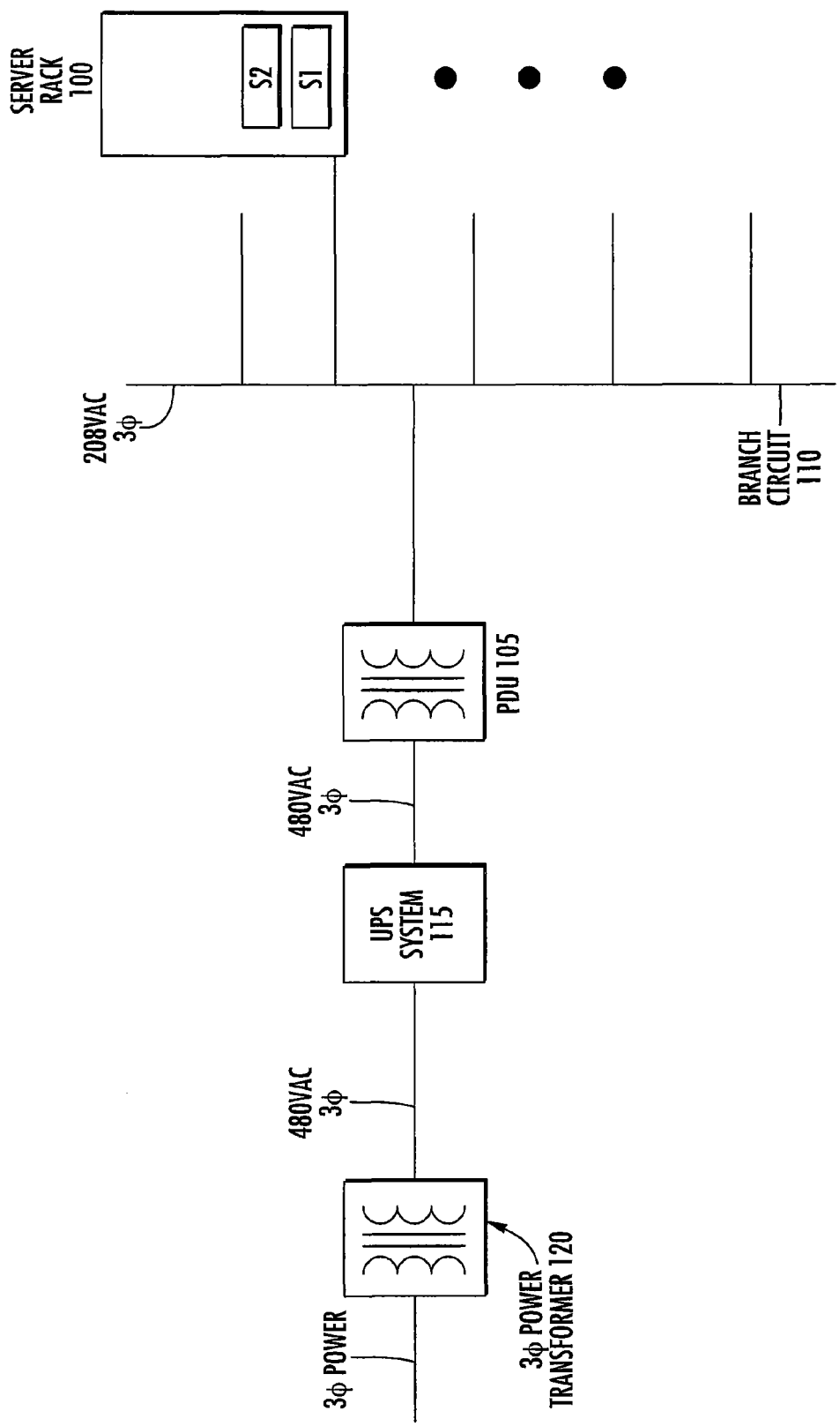
FIG. 1A is a block diagram showing a conventional power distribution system for a data center including servers housed in racks.
Figure 1B:
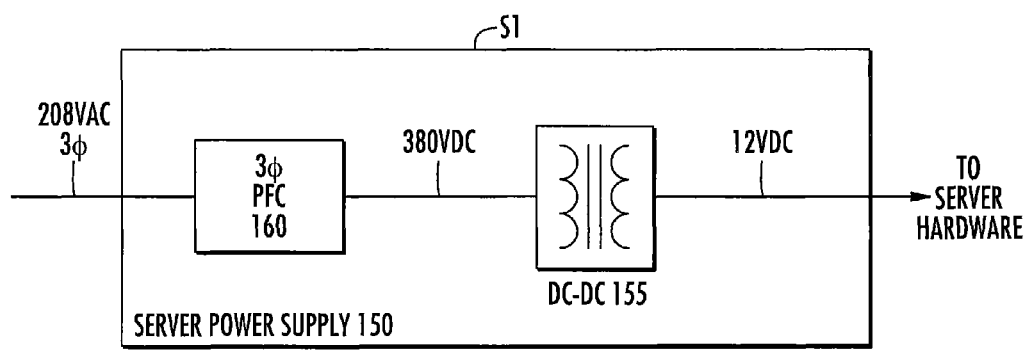
FIG. 1B is a block diagram illustrating a conventional server power supply.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As appreciated by the present inventors, single phase wireless power transfer systems may be inefficient when called upon to carry relatively heavy loads, such as those that would be presented by a particular number of servers located within a single server rack. For example, as appreciated by the present inventors, many server racks within data centers may house so many servers that the total power requirement for all the servers within the rack may be so high that single phase power may not be efficiently wirelessly transferred. Accordingly, as appreciated by the present inventors, multi-phase wireless power transfer may provide both a modular approach to wireless power transfer at high power levels as well as provide improved efficiency relative to single phase wireless power transfer systems. For example, if a server rack calls for about 1.5 kW or more power to power the housed servers, wirelessly transferring that level of power may be inefficient. Accordingly, a multi-phase wireless power transfer system can be deployed at a rack level so that the racks are provided with sufficient power at relatively high efficiency.

In some embodiments according to the invention, the multi-phase wireless power transfer can therefore be provided from a transmitter portion to a receiver portion at a power level that is configured to operate a plurality of servers housed within the rack. In other words, given a particular number of servers housed within the server rack, the multi-phase wireless power transfer system can transfer power wirelessly from the transmitter portion to the receiver portion of the system which is associated with that particular rack of servers. Still further, as the power requirements of the server increases because of either additional servers or servers with higher power requirements, additional power can be provided by the multi-phase wireless power transfer system due to its modular architecture. In other words, additional wireless power transfer can be provided by the system when additional power is called for by scaling the transmitter/receiver portions up. For example, in some embodiments according to the invention, the power level that is wirelessly transferred to the servers within the rack can be about 1.5 kW or more.

In some embodiments according to the invention, the multi-phase wireless power transfer system is coupled to a power distribution unit by a branch circuit conductor that may be deployed within the data center. For example, in some embodiments according to the invention, the power distribution unit can provide multi-phase AC power to the branch circuit conductor which is coupled to the wireless power transfer system. Still further, the branch circuit can include a plurality of conductors to connect a plurality of multi-phase wireless power transfer systems in parallel with one another. Still further, in some embodiments according to the invention, the power distribution unit that is coupled to the branch circuit can provide multi-phase power at a relatively low frequency, such as 60 or 50 Hz, whereas the multi-phase wireless power transfer system can wirelessly transfer power at much higher frequency, such as 20 KHz to about 400 KHz.

Figure 11:
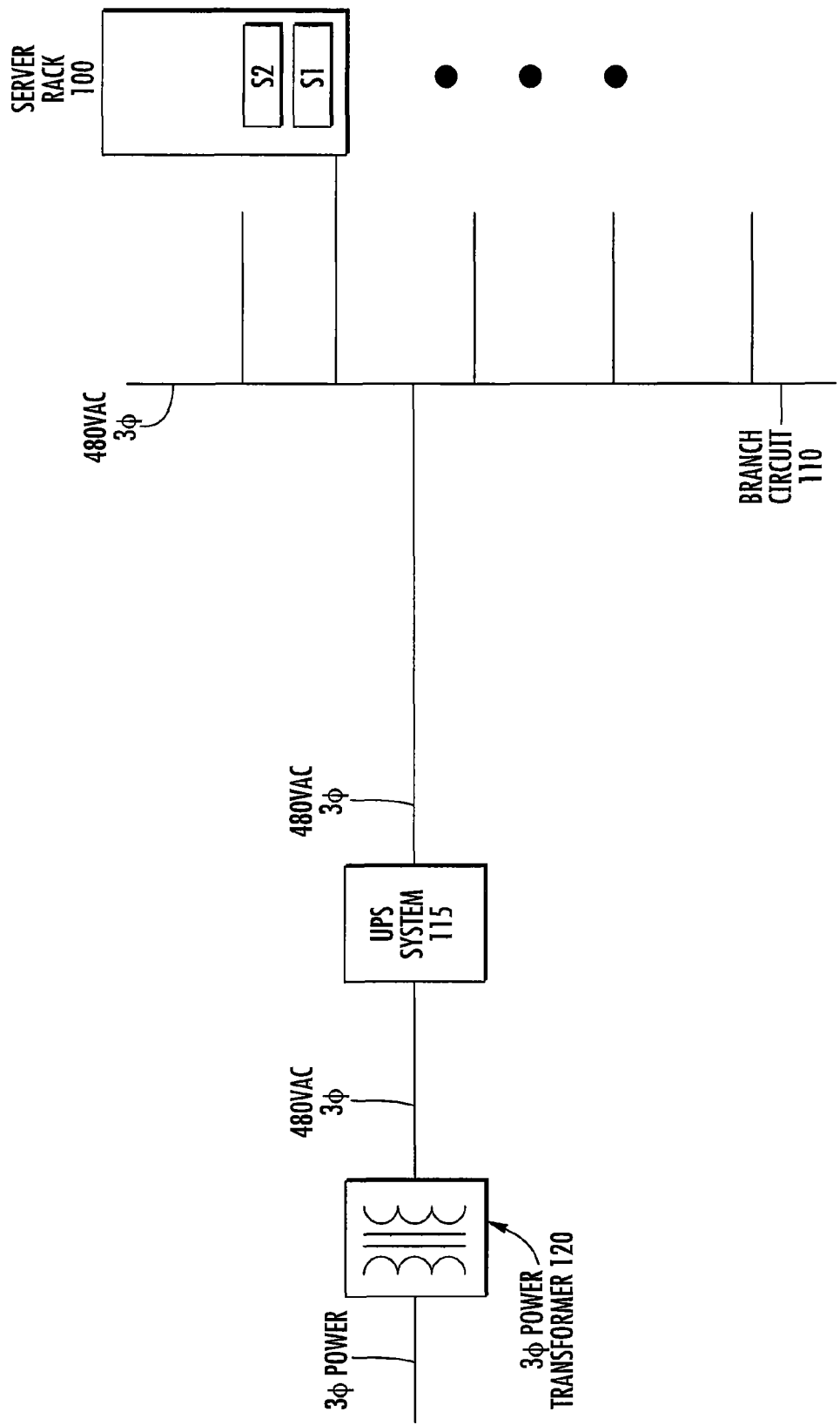
FIG. 11 is a block diagram that illustrates a wireless power transfer system coupled directly to a UPS system by a branch circuit in some embodiments according to the invention.

In some embodiments according to the invention, the multi-phase wireless power transfer system is coupled to a UPS system (rather than a power distribution unit) by a branch circuit conductor that may be deployed within the data center, as shown for example, in FIG. 11. For example, in some embodiments according to the invention, the UPS system can provide multi-phase AC power to the branch circuit conductor which is coupled to the multi-phase wireless power transfer system. The branch circuit can include a plurality of conductors to connect a plurality of multi-phase wireless power transfer systems in parallel with one another. In some embodiments according to the invention, the UPS system that is coupled to the branch circuit can provide multi-phase power at a relatively low frequency, such as 60 or 50 Hz, whereas the multi-phase wireless power transfer system can wirelessly transfer multi-phase power at a much higher frequency, such as at a frequency greater than about 20 KHz. In some embodiments, the multi-phase wireless power transfer system can wirelessly transfer multi-phase power at a frequency of about 20 KHz to about 400 KHz.

In still further embodiments according to the invention, the multi-phase wireless power transfer system can include a power factor control circuit that provides DC power to a modular multi-phase inverter circuit (including for example an H-bridge inverter circuit) for the provisioning of multi-phase power that is to be transferred wirelessly. In other embodiments according to the invention, the multi-phase wireless power transfer system can include a modular multi-phase inverter circuit that provides the function of both power factor control as well as the generation of high frequency multi-phase power for the wireless transfer without the need for a separate power factor control circuit. It will be understood, however, that such an approach may utilize 3-phase power (or multiples thereof) for the wireless power transfer.

Figure 2:
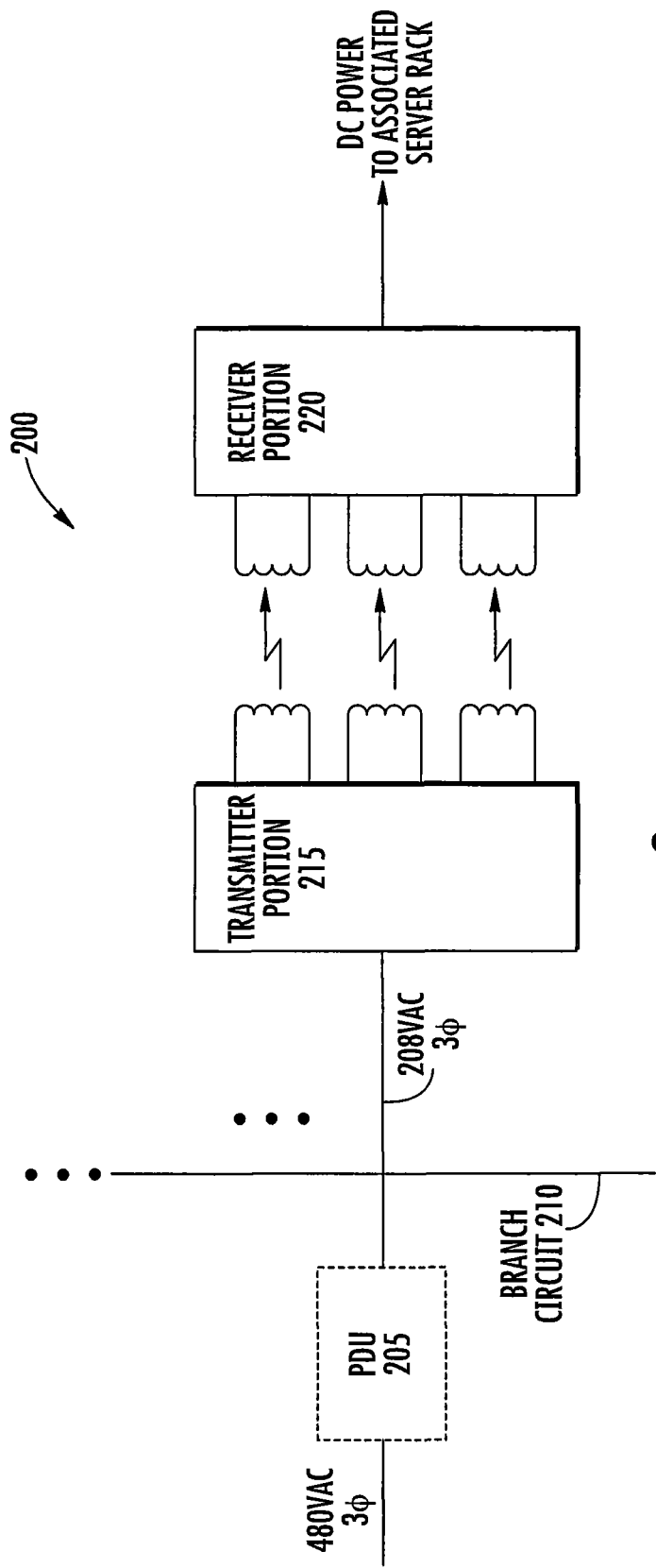
FIG. 2 is a block diagram that illustrates a wireless power transfer system including a transmitter portion and a receiver portion configured to wirelessly transfer multi-phase power at a power level that is configured to operate a plurality of electrical components housed within an electrical component rack associated with the wireless power transfer system in some embodiments according to the invention.

FIG. 2 is a block diagram that illustrates a wireless power transfer system including a transmitter portion and a receiver portion configured to wirelessly transfer multi-phase power at a power level that is configured to operate a plurality of electrical components housed within an electrical component rack that is associated with the wireless power transfer system in some embodiments according to the invention. It will be understood that although FIG. 2 illustrates the multi-phase wireless power transfer system 200 as receiving 3-phase power, embodiments according to the invention can apply to the transfer of any multi-phase power. The illustration of 3-phase power shown in the Figures is exemplary and is not limited thereto. Accordingly, the term "multi-phase power" refers to the use of power provided in more than a single phase.

According to FIG. 2, the multi-phase wireless power transfer system 200 receives 3-phase power from a power distribution unit 205 over a branch circuit 210. The branch circuit 210 includes a plurality of branch circuit conductors configured to transfer the 3-phase power from the power distribution unit 205 to a plurality of multi-phase wireless power transfer systems that are coupled in parallel to one another. Therefore, although FIG. 2 shows a single multi-phase wireless power transfer system 200, it will be understood that other multi-phase wireless power transfer systems can be coupled in parallel to the system shown by the branch circuit 210.

The power distribution unit 205 can receive high level 3-phase power, which can be "stepped-down" to a lower magnitude 3-phase power for provisioning to the multi-phase wireless power transfer system 200. It will be further understood that the 3-phase power provided to/from the power distribution unit 205 can be transferred at relatively low frequencies, such as about 50 or 60 Hz. Other low frequencies may also be used. It will be understood that the power distribution unit 205 can take the form of a step-down transformer to step-down, for example, 480 VAC 3-phase power to 208 VAC 3-phase power as shown. It will be understood, however, that these values are exemplary and embodiments according to the present invention are not limited thereto.

As shown in FIG. 2, the power distribution unit 205 is dashed to indicate that, in some embodiments, the power distribution unit 205 is optional. For example, as shown in FIG. 11, a multi-phase wireless power transfer system can be coupled directly to the UPS system 115 by the branch circuit 110 in some embodiments according to the invention. In such embodiments, the high level 3-phase power can be directly provided to the multi-phase wireless power transfer system 200 via the branch circuit 110. It will be further understood that the 3-phase power provided from the UPS system 115 can be a relatively low frequency, such as about 50 to about 60 Hz. Other low frequencies may also be used. It will be understood that the UPS may provide any multi-phase power to the multi-phase wireless power transfer system 200, such as 480 VAC 3-phase power, 208 VAC 3-phase power, or 1000 VAC 3-phase power. It will be understood, however, that these values are exemplary and embodiments according to the present invention are not limited thereto.

As further shown in FIG. 2 the wireless power transfer system 200 can include a transmitter portion 215 that receives the 3-phase power over the branch circuit 210. The transmitter portion 215 includes a plurality of separate transmitter coils that are configured to wirelessly transmit respective phases of the multi-phase power to a plurality of receiver coils included with a receiver portion 220 of the multi-phase wireless power transfer system 200. It will be understood that in some embodiments, the transmitter coils can be separated from the receiver coils by a gap of about 0.1 mm to about 5 cm, such when used for Datacenter racks, to provide efficient multi-phase wireless power transfer, as described in, for example, U.S. patent application Ser. No. 14/579,007, entitled WIRELESS POWER TRANSFER APPARATUS AND POWER SUPPLIES INCLUDING OVERLAPPING MAGNETIC CORES, which is commonly assigned to the present assignee the disclosure of which is incorporated herein by reference. Other spacing may also be used.

According to FIG. 2, each of the transmitter/receiver coils is configured to wirelessly transmit a particular phase of the multi-phase power from the transmitter portion 215 to the receiver portion 210. Accordingly, more transmitter/receiver coils may be added to the system 200 to accommodate additional phases and to scale up the power transferred in accordance with the demands of the servers. Also, in some embodiments according to the invention, fewer coils may also be used.

According to FIG. 2, the system 200 is associated with a server rack that is configured to receive DC power from the receiver portion 220. It will be understood that the server rack can be configured to house a plurality of servers in, for example, a data center. Although servers are illustrated herein as being housed in server racks, embodiments according to the invention can be utilized for any electrical component that can be aggregated in a modular fashion so that ones of the electrical components can be added or removed, so that an associated power supply may be called on to deliver more or less power depending on the number of electrical components added/removed. Accordingly, embodiments according to the invention are not limited to use with servers or to server racks, but rather can be utilized with any modular electrical component that be aggregated for the purposes of power provisioning.

It will be understood that in some embodiments according to the invention, the multi-phase wireless power transfer system 200 is configured to wirelessly transfer a level of power that is configured to operate the plurality of electrical components housed within (or otherwise associated with) the rack. Accordingly, greater levels of power may be accommodated by the inclusion of additional phases (or legs) in the multi-phase wireless power transfer system. Therefore, if additional servers are to be included in the rack, additional phases of the multi-phase power system may be added to wirelessly transfer additional power to the servers at acceptable efficiency.

In still other embodiments, the multi-phase wireless power transfer system may determine that a single phase wireless power transfer mechanism may provide more efficiency when, for example, the power load is reduced to below about 1.5 KW. Still further, the multi-phase wireless power transfer system may return to the multi-phase wireless power transfer mechanism when servers are added to increase the load to more than about 1.5 KW.

According to FIG. 2, the server is associated with the multi-phase wireless power transfer system 200, in that the system 200 is configured to wirelessly transfer the power that is called for by the number of associated servers (e.g., servers housed within the rack 100). For example, in some embodiments according to the invention, the DC output of the receiver portion 220 is hardwired into a DC power distribution network within the rack, by which the servers can access DC power. In some embodiments according to the invention, the receiver portion 220 is associated with the rack by inclusion into the rack. In some embodiments according to the invention, the receiver portion 220 can be outside the rack and is associated with the rack by an electrical conductor that hardwires the receiver portion 220 to the DC power distribution network within the rack. Accordingly, each of the multi-phase wireless power transfer systems 200 depicted in FIG. 2 can have a respective associated rack to which the respective system 200 provides a level of power that is configured to operate those servers housed by the respective rack. In some embodiments, the multi-phase wireless power transfer system 200 is associated with a particular rack in that the system 200 is configured to provide power primarily to that particular rack, but may not be housed within the rack.

Figure 3:
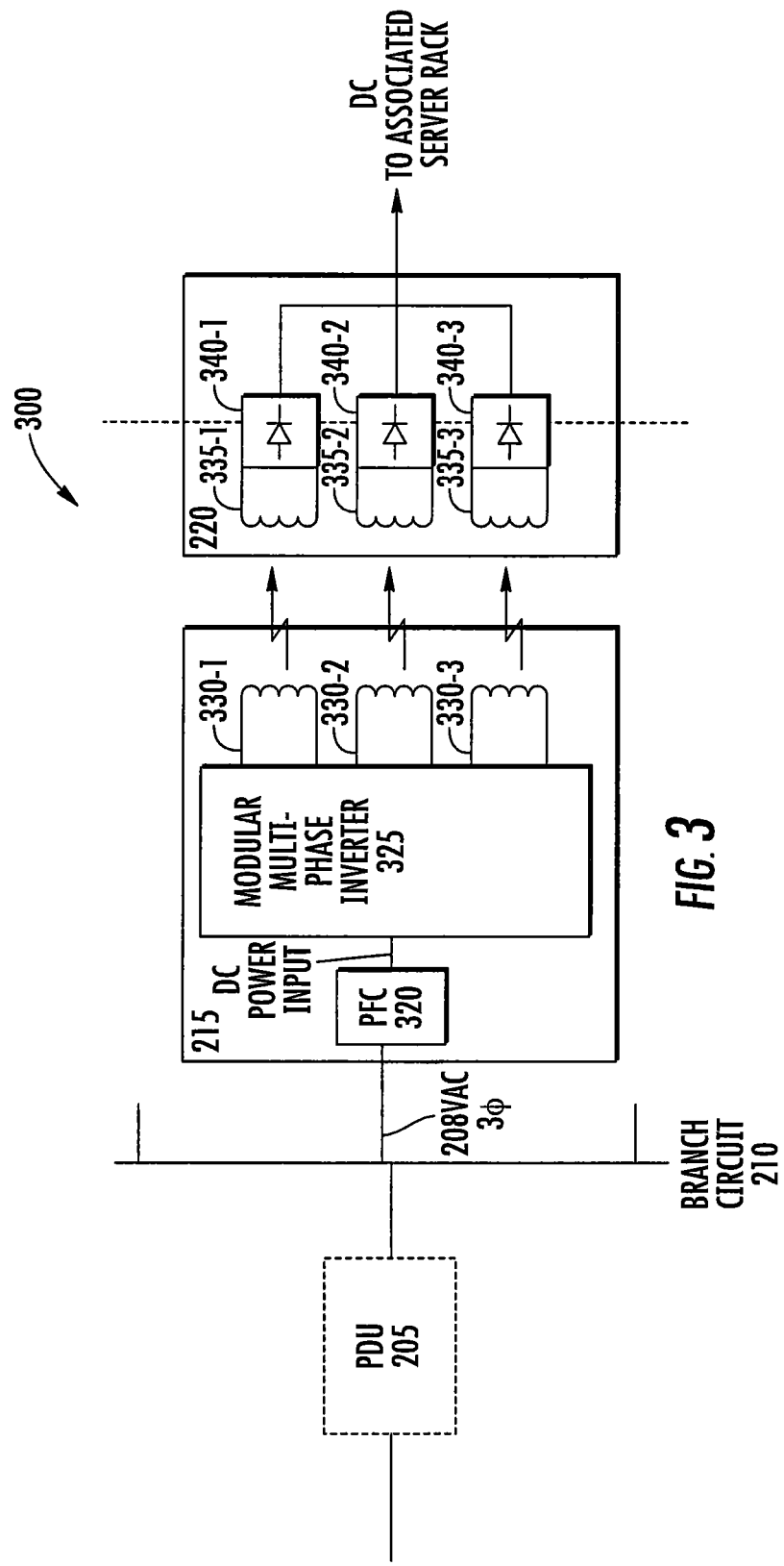
FIG. 3 is a block diagram of the wireless power transfer system of FIG. 2 including a more detailed view of the transmitter and receiver portions in some embodiments according to the invention.

FIG. 3 is a block diagram of the wireless power transfer system of FIG. 2 including a more detailed view of the transmitter and receiver portions in some embodiments according to the invention. According to FIG. 3, the transmitter portion 215 can include a power factor control (PFC) circuit 320 that receives the 3-phase AC power over the branch circuit 210 and is configured to provide a DC power input to a modular multi-phase inverter circuit 325.

As further shown in FIG. 3, the modular multi-phase inverter circuit 325 is coupled to three transmitter coils 330-1 to 330-3, each of which is configured to wirelessly transmit a respective phase of the 3-phase power. The 3-phase AC power can be provided to the modular multi-phase inverter circuit 325 at a frequency of about 50-60 Hz, although other low frequencies may also be used. The modular multi-phase inverter circuit 325 is configured to convert the lower frequency 3-phase AC power to higher frequency 3-phase AC power, such as at a frequency that is greater that about 20 KHz, although other high frequencies can also be used. It will be understood that the modular multi-phase inverter circuit 325 can be scaled up to include additional phases and coils if a greater power level is called for by the servers.

As further shown in FIG. 3, the receiver portion 220 includes respective receiver coils 335-1 to 335-3, each of which is in wireless communication with the respective transmitter coil to provide for the transfer of each respective phase of power. The respective output of each of the receiver coils 335-1 to 335-3 is connected to a respective input to one of the rectifier circuits 340-1 to 340-3. As shown in FIG. 3, the outputs of each of the rectifier circuits 340-1 to 340-3 can be coupled together in parallel to provide a single DC power output to the associated rack. In some embodiments, the outputs of each of the rectifier circuits 340-1 to 340-3 can supply DC power separately to individual servers or other components in the rack.

Figure 4:
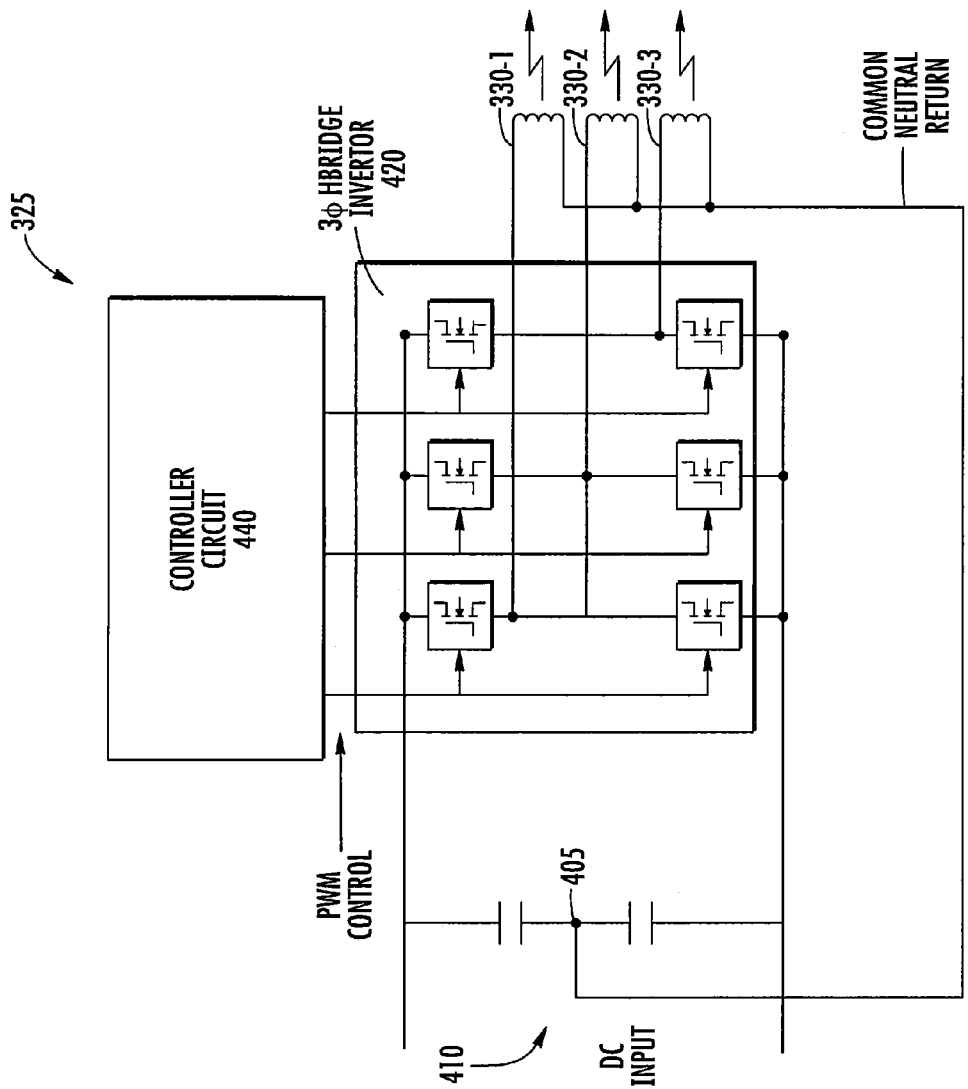
FIG. 4 is a block diagram of a modular multi-phase inverter circuit shown in FIG. 3 in some embodiments according to the invention.

FIG. 4 is a block diagram of a modular multi-phase inverter circuit shown in FIG. 3 in some embodiments according to the invention. According to FIG. 4, in some embodiments according to the invention, the DC power input from the PFC circuit 320 is coupled to the 3-phase H-bridge circuit 420 through a capacitor network 410. The capacitor network 410 includes at least two capacitors coupled in series across the input to the 3-phase H-bridge circuit 420 to provide a midpoint node 405. It will be understood that in operation, the output of the 3-phase H-bridge inverter circuit 420 can be a symmetrical voltage waveform (i.e., such as a square wave) having a voltage that is symmetrical with respect to the midpoint node 405. For example, a square wave output that switches between +/−Volts would be developed so that the voltage at midpoint node 405 is about 0 Volts.

The 3-phase H-bridge inverter circuit 420 operates on the DC input power responsive to a control circuit 440. The control circuit 440 provides control signals to the gates of the 3-phase H-bridge circuit 420 so that each of the legs coupled to a respective one of the transmitter coils 330-1 to 330-3 carries a respective current of the 3-phase power. It will be understood that each of the phases carried by a respective leg in the 3-phase H-bridge circuit 420 can represent one third of the total power that is to be transmitted to the receiver portion. The control circuit 440 also provides the control signals to the 3-phase H-bridge circuit 420 so that each phase carried by a leg excites the respective transmitter coil at a high frequency to enable the wireless transmission of that phase to the receiver portion. In some embodiments, each leg carries the respective phase at frequency about 20 KHz to about 400 KHz.

As further shown in FIG. 4, each of the transmitter coils 330-1 to 330-3 is coupled to the midpoint node 405 of the capacitor network 410 to provide a common neutral return for the modular multi-phase inverter circuit 325. The common neutral return can be made to carry approximately 0 current (as shown for example in FIG. 5B) by operating each of the legs in the 3-phase H-bridge circuit 420 to be out-of-phase with one another. In particular, in the 3-phase system shown in FIG. 4, the PWM signals from the control circuit 440 can operate the 3-phase H-bridge circuit 420 so that each of the respective legs in the H-bridge circuit 420 generates a current that is 120 degrees out-of-phase with one another, as shown for example in FIG. 5C.

Moreover, because of the modular structure of the 3-phase H-bridge circuit 420, additional legs may be added to wirelessly transfer higher levels of power. For example, if each leg in the 3-phase H-bridge circuit 420 is configured to transfer 1.5 kW, a total power transfer can be about 4 kW (i.e., about 1.5 kW for each leg). If, however, the power level to be transferred is about 6 kW, an additional leg can be added to the 3-phase H-bridge circuit 420 to provide a 4-leg implementation where each of the 4 legs is configured to carry 1.5 kW. It will be further understood that the PWM signals provided by the controller circuit 440 can be configured so that each pair of the legs in the 4-leg implementation would be shifted by 180 degrees relative to one another to maintain the common neutral return current at about 0.

In embodiments configured to transfer additional power, it will be understood that the receiver portion 220 would be similarly configured. For example, in the 4-leg system described above, the receiver portion would also include a 4$^{th}$ receiver coil operatively coupled to the 4$^{th}$ transmitter coil in the 4-leg system.

Figure 5A:
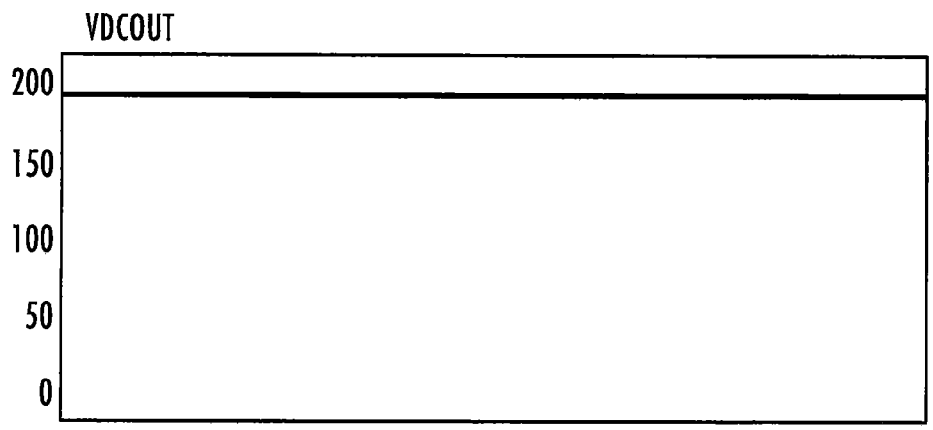
FIGS. 5A-5C are graphs showing simulated performance of a wireless power transfer system of FIG. 4 in some embodiments according to the invention.
Figure 5B:
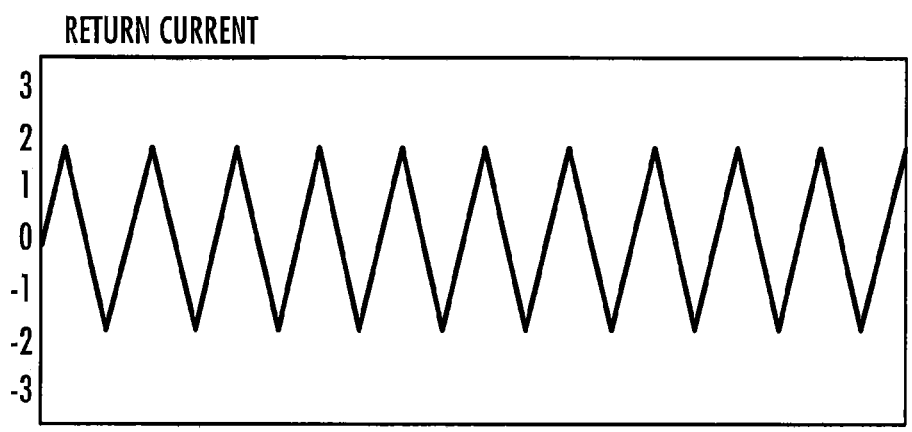
Figure 5C:
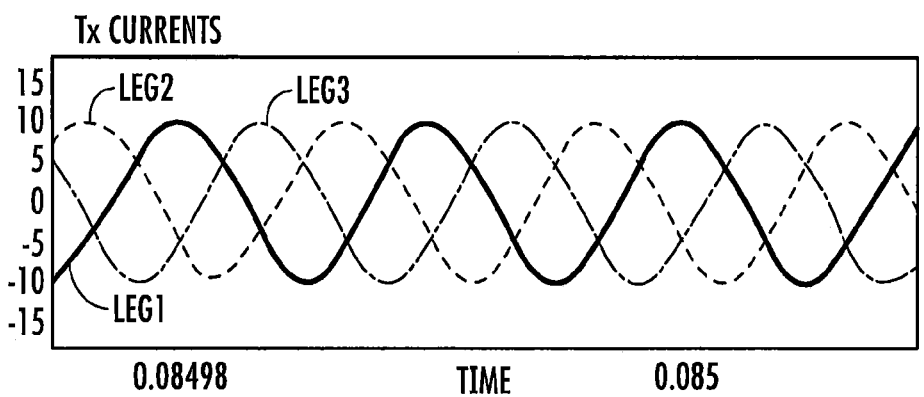

In the graphs shown in FIGS. 5A-5C, simulated results are illustrated for a DC voltage of about 195 volts delivered at the receiver using the multi-phase wireless power transfer systems in some embodiments. Moreover, the total power delivered is configured to be about 7 kW. FIG. 5C shows that each of the currents carried in the respective 3 legs is out-of-phase with one another due to the phase shifted relationship between the PWM signals. FIG. 5B shows a current variation within the common neutral return can be between about +2 amps to about −2 amps of ripple.

It will be further understood that the controller circuit 440 can be configured to operate the 3-phase H-bridge circuit 420 using a pulse width modulation scheme such as that described in U.S. patent application Ser. No. 14/590,452 entitled METHODS, CIRCUITS AND ARTICLES OF MANUFACTURE FOR CONTROLLING WIRELESS POWER TRANSFER RESPONSIVE TO CONTROLLER CIRCUIT STATES, which is commonly assigned to the current Assignee, the entire disclosure of which is incorporated herein by reference.

Figure 6:
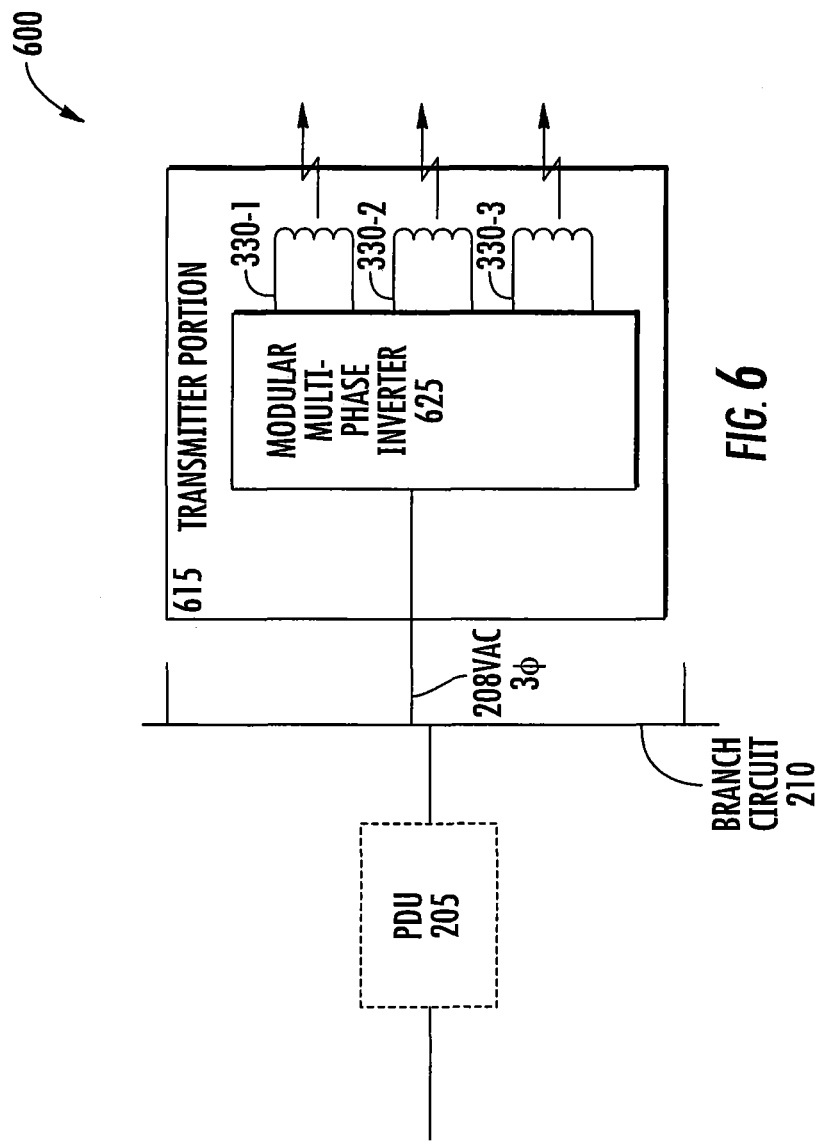
FIG. 6 is a block diagram illustrating a transmitter portion of the wireless power transfer system of FIG. 2 including a modular multi-phase inverter circuit in some embodiments according to the invention.

FIG. 6 is a block diagram illustrating a transmitter portion 615 of the wireless power transfer system of FIG. 2 including a modular multi-phase inverter circuit 625 in some embodiments according to the invention. According to FIG. 6, the modular multi-phase inverter circuit 625 may not require the inclusion of a separate power factor control (PFC) circuit as shown in FIG. 3. To the contrary, the 3-phase power can be provided directly to the input of the modular multi-phase inverter circuit 625 without conversion by a PFC to DC power.

Figure 7A:
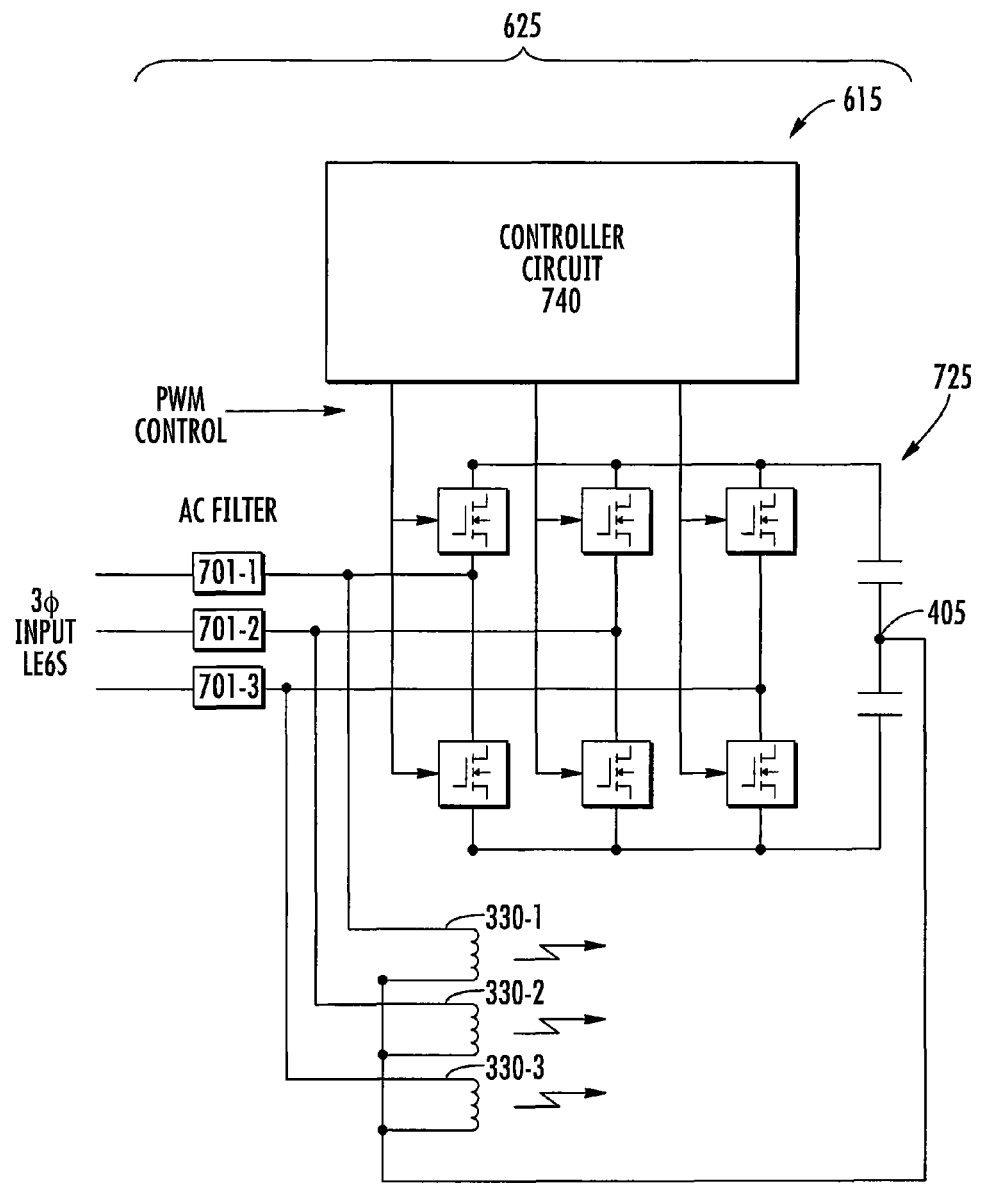
FIG. 7A is a block diagram illustrating a more detailed view of the modular multi-phase inverter circuit shown in FIG. 6 in some embodiments according to the invention.

As shown in FIG. 7A, the modular multi-phase inverter circuit 625 can include respective AC filters coupled in line with each of the phases provided to the input of the modular multi-phase inverter circuit 625. Each of the AC filters is also connected to a respective one of the legs at the AC side of a 3-phase H-bridge circuit 725. Each of the legs is also coupled to a respective one of the transmitter coils 330-1 to 330-3. Moreover, each of the transmitter coils 330-1 to 330-3 is also coupled to a common neutral return which is connected to a midpoint node 405 of a capacitor network shown at the DC side of the H-bridge circuit 725.

In operation, a controller circuit 740 provides pulse width modulation signals to the gates of the 3-phase H-bridge circuit 725 to provide both power factor control as well as to generate each of the high frequency phases of the 3-phase power transmitted by the transmitter coils 330-1 to 330-3. Accordingly, the H-bridge circuit 725, under the control of the controller circuit 740, can provide the function of both the power factor control as well as the generation of high frequency 3-phase power to be transferred to the receiver portion. It will be further understood that each of the phases carried by a respective leg in the 3-phase H-bridge circuit 725 can represent one third of the total power that is to be transmitted to the receiver portion. The control circuit 740 also provides the control signals to the 3-phase H-bridge circuit 725 so that each phase carried by a leg excites the respective transmitter coil at a high frequency to enable the wireless transmission of that phase to the receiver portion. In some embodiments, each leg carries the respective phase at frequency greater than about 20 KHz. In some embodiments, each leg carries the respective phase at frequency greater than about 20 KHz to about 400 KHz. It will be further understood that the configuration shown in FIG. 7A provides a multi-phase wireless power transfer wherein the number of phases included in the multi-phase power is equal to 3 or a multiple of 3.

Figure 7B:
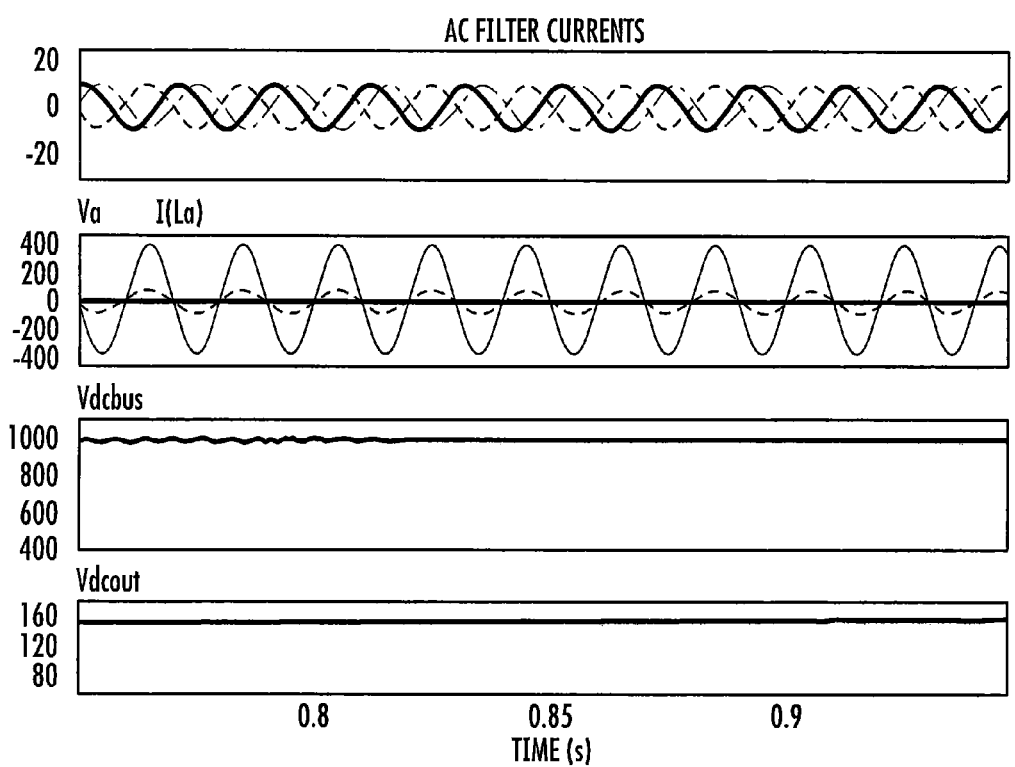
FIG. 7B includes graphs showing simulated performance of a wireless power transfer system of FIG. 7A in some embodiments according to the invention.

FIG. 7B includes graphs showing simulated performance of the multi-phase wireless power transfer system of FIG. 7A in some embodiments according to the invention In the graphs of FIG. 7B, simulated results are illustrated for a DC voltage of about 160 volts delivered by the receiver using the multi-phase wireless power transfer systems in some embodiments. FIG. 7B shows, respectively, each of the currents carried in the respective 3 legs through the AC filters, the in-phase current and voltage generated by the multi-phase wireless power transfer system resulting from the power factor correction operation, the DC voltage across the capacitor network, and the DC voltage on the receiver side.

Figure 12:
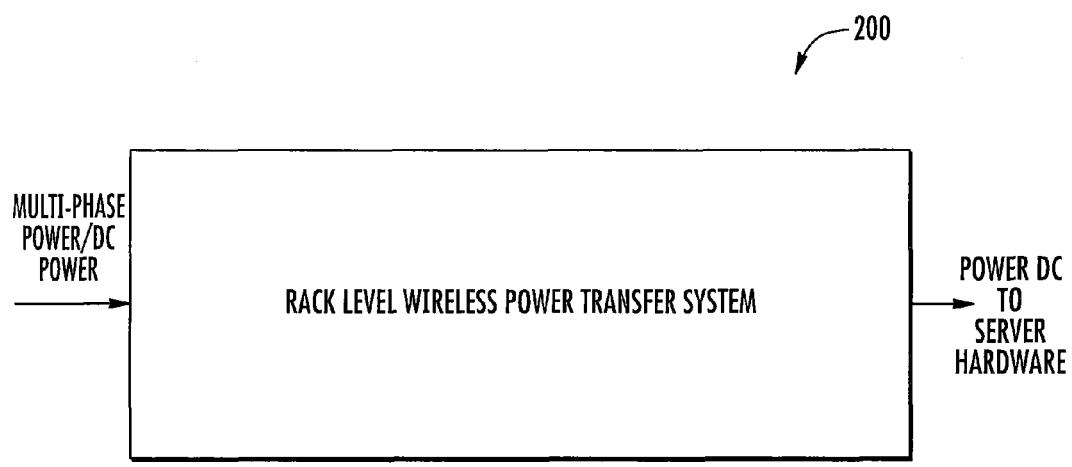
FIG. 12 is a block diagram that illustrates a wireless power transfer system coupled to a branch circuit without a power distribution unit and separate power factor correction circuit in some embodiments according to the invention.

In some embodiments according to the invention, the multi-phase wireless power transfer system 200 shown in FIG. 12 can be provided with the multi-phase power directly from the UPS 115 (without an intervening power distribution unit 105) and without a separate power factor correction circuit. For example, in some embodiments, the modular multi-phase inverter circuit 625 of FIG. 7A may be coupled directly to the UPS system 115 to receive any of the multi-phase AC power levels described herein.

In further embodiments according to the invention, according to FIG. 12 a high voltage DC voltage can be provided to the multi-phase wireless power transfer system 200. In such embodiments, the high voltage DC can be provided to the input of the multi-phase wireless power transfer system 200 over the branch circuit 110, which can be inverted and converted to high frequency multi-phase AC power for the multi-phase wireless power transfer to the receiver and provisioning of a low voltage DC voltage to the components in the rack. In some embodiments, the high voltage DC provided to the input of the multi-phase wireless power transfer system 200 can be about 1000 VDC. Other DC voltage levels can also be used.

Figure 8A:
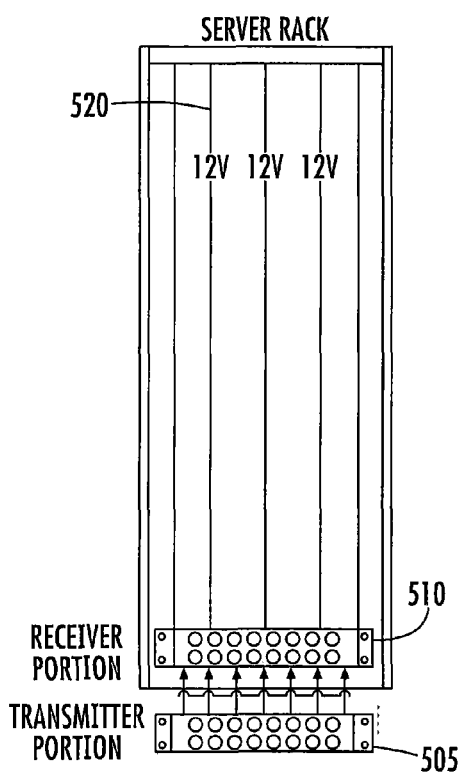
FIGS. 8A-8B are schematic illustrations of a wireless power transfer system and an associated server rack configured to provide different DC power distributions to servers within the rack in some embodiments according to the invention.
Figure 8B:
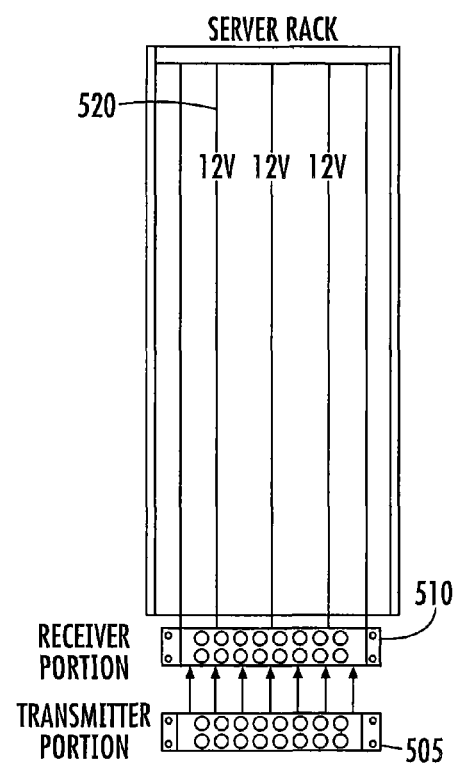

FIGS. 8A-8B are schematic illustrations of a wireless power transfer system and an associated server rack utilizing different DC power distributions 520 to servers within the racks in some embodiments according to the invention. According to FIG. 8A, the transmitter portion 505 is associated with the server rack 800 so that the multi-phase wireless power transfer to the receiver portion 510 can be provided as DC power to the server rack 800. Furthermore, the receiver portion 510 can be housed within the server rack, whereas the transmitter portion 505 may be located outside the server rack and is spaced apart from the receiver portion by a gap of about 0.1 mm to about 5 cm. In some embodiments, the transmitter portion 505 and the receiver portion 510 are both housed in the rack 800. As shown in FIG. 8B, the receiver portion 505 is associated with, but located outside, the server rack 800. Furthermore, the transmitter portion 505 can also be located outside the rack and is spaced apart from the receiver portion by a gap of about 0.1 mm to about 5 cm.

Figure 9:
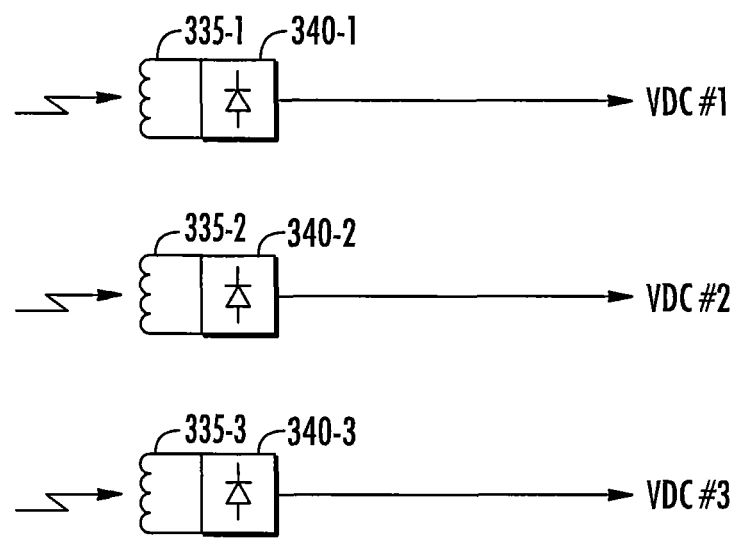
FIG. 9 is a more detailed view of a particular arrangement of DC power distribution to servers within a rack in some embodiments according to the invention.

FIG. 9 is a more detailed view of a particular arrangement of DC power distribution to servers within a rack in some embodiments according to the invention. According to FIG. 9, each of the wirelessly transmitted phases of the multi-phase power is operatively coupled to a respective one of the receiver coils 335-1 to 335-3. Moreover, each of the receiver coils is coupled to a respective rectifier circuit 340-1 to 340-3. Each of the rectifier circuits provides a dedicated DC power distribution to the server rack rather than an arrangement where the outputs of the rectifier circuits are connected in paralleled with one another, as shown in FIG. 3, for example. It will also be understood that any combination of the arrangements shown in FIGS. 3 and 9 may be used in some embodiments.

Figure 10:
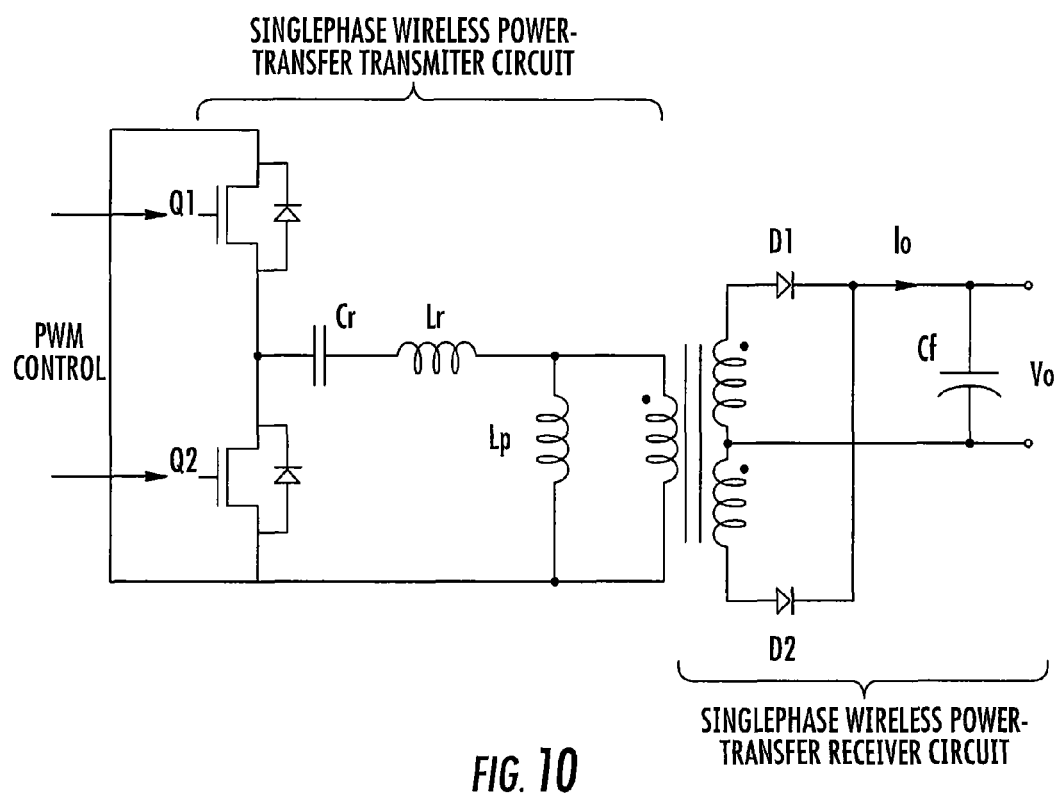
FIG. 10 is a schematic illustration of a wireless power transmitter circuit in and associated wireless power transfer receiver circuit associated with a single phase of power shown in the wireless power transfer system of FIG. 2 in some embodiments according to the invention.

FIG. 10 shows an exemplary wireless power transfer transmitter circuit coupled to a respective transmitter coil and configured for wireless coupling to a respective receiver coil included in a corresponding wireless power transfer receiver circuit. It will be understood that the arrangement shown in FIG. 10 represents the components that may be used for wireless power transfer of a single phase in a multi-phase wireless power transfer system. Therefore, a wireless power transfer transmitter circuit and wireless power transfer receiver circuit may be utilized for each of the phases transmitted.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to blocks of methods, circuits and articles of manufacture including computer readable code according to embodiments of the disclosure. It will be understood that some blocks of the block diagrams, and combinations of blocks, can be implemented by computer program instructions. These computer program instructions may be provided to a processor circuit or controller circuit of a general purpose computer, special purpose computer, or other programmable data processing apparatus to produce a machine, such that the instructions, which execute via the processor of the computer or other programmable instruction execution apparatus, create a mechanism for implementing the functions/acts specified in the block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the block diagram block or blocks.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed:

1. A method of providing wireless power transfer comprising:
   receiving multi-phase power at a transmitter portion of a multi-phase wireless power transfer system that is associated with an electrical equipment rack that is configured to house a plurality of electrical components; and wirelessly transferring separate phases of the multi-phase power from the transmitter portion to a receiver portion of the multi-phase wireless power transfer system at a power level that is configured to operate the plurality of electrical components, wherein receiving multi-phase power comprises receiving the multi-phase power via a branch circuit conductor.

2. The method of claim 1 wherein the power level is greater than about 1.5K Watts.

3. The method of claim 1 wherein the branch circuit conductor electrically connects a power distribution unit to a plurality of multi-phase wireless power transfer systems in parallel with each other.

4. The method of claim 1 wherein wirelessly transferring the multi-phase power comprises wirelessly transferring the multi-phase power from the transmitter portion to the receiver portion using an inverter circuit operating at a frequency greater than about 20 KHz.

5. The method of claim 1 wherein the multi-phase power comprises low frequency multi-phase power, wherein receiving the multi-phase power at the transmitter portion further comprises:
performing power factor control on the multi-phase power to provide dc power; and
operating on the dc power to provide high frequency multi-phase power to the transmitter portion of the multi-phase wireless power transfer system.

6. A method of providing wireless power transfer comprising:
receiving multi-phase power at a transmitter portion of a multi-phase wireless power transfer system that is associated with an electrical equipment rack that is configured to house a plurality of electrical components; and
wirelessly transferring the multi-phase power from the transmitter portion to a receiver portion of the multi-phase wireless power transfer system at a power level that is configured to operate the plurality of electrical components, wherein the multi-phase power comprises low frequency multi-phase power, wherein receiving the multi-phase power at the transmitter portion further comprises:
operating on the multi-phase power using a multi-leg H-Bridge circuit at an inverter frequency, to provide both power factor control and high frequency multi-phase power at the transmitter portion, wherein a number of phases included in the multi-phase power is 3 or a multiple of 3, and a number of legs in the multi-leg H-Bridge circuit matches the number of phases.

7. The method of claim 6 wherein wirelessly transferring comprises wirelessly transferring the high frequency multi-phase power at a resonant frequency of the multi-phase wireless power transfer system that matches the inverter frequency.

8. The method of claim 1 wherein the multi-phase power comprises low frequency multi-phase power, wherein receiving the multi-phase power at the transmitter portion further comprises:
operating on the multi-phase power using an H-Bridge circuit at an inverter frequency, to provide high frequency multi-phase power at the transmitter portion via multiple legs of the H-Bridge circuit, wherein each phase of the high frequency multi-phase power on a respective one of the multiple legs of the H-Bridge circuit is out-of-phase relative to other phases of the high frequency multi-phase power.

9. A method of providing wireless power transfer comprising:
receiving multi-phase power at a transmitter portion of a multi-phase wireless power transfer system that is associated with an electrical equipment rack that is configured to house a plurality of electrical components; and
wirelessly transferring the multi-phase power from the transmitter portion to a receiver portion of the multi-phase wireless power transfer system at a power level that is configured to operate the plurality of electrical components, wherein wirelessly transferring the multi-phase power comprises wirelessly transmitting each phase of the multi-phase power via a separate transmitter coil to provide a respective transmitted phase of the multi-phase power, the method further comprises:
receiving each transmitted phase of the multi-phase power at the receiver portion via a separate receiver coil to provide respective phases of the multi-phase power; and
rectifying the respective phases of the multi-phase power to provide dc power at the electrical equipment rack.

10. A multi-phase wireless power transfer system comprising:
a transmitter portion of the multi-phase wireless power transfer system associated with an electrical equipment rack that is configured to house a plurality of electrical components, the transmitter portion configured to wirelessly transfer multi-phase power at a power level that is configured to operate the plurality of electrical components, wherein the multi-phase power includes at least two separate phases having a fixed phase difference relative to one another, wherein the transmitter portion is configured to couple to a branch circuit conductor to receive the multi-phase power.

11. The system of claim 10 wherein the power level is greater than about 1.5K Watts.

12. The system of claim 10 wherein the branch circuit conductor is configured to electrically connect a power distribution unit to a plurality of multi-phase wireless power transfer systems in parallel with each other.

13. The system of claim 10 wherein the multi-phase power comprises low frequency multi-phase power, wherein the transmitter portion further comprises:
a modular multi-phase inverter circuit configured to generate high frequency multi-phase power from the low frequency multi-phase power; and
a controller circuit coupled to the modular multi-phase inverter circuit, the controller circuit configured to operate the modular multi-phase inverter circuit at a frequency greater than about 20 KHz to generate the high frequency multi-phase power.

14. The system of claim 10 wherein the multi-phase power comprises low frequency multi-phase power, wherein transmitter portion further comprises:
a power factor control circuit having an input configured to couple to the low frequency multi-phase power to generate dc power at an output;
a capacitor network coupled across the output and including a mid-point node, the capacitor network configured to provide a symmetrical dc voltage relative to a voltage at the mid-point node;
a modular multi-phase inverter circuit configured to generate high frequency multi-phase power from the dc power;

a plurality of transmitter coils each coupled to a respective phase of the high frequency multi-phase power and each connected to a common neutral return coupled to the mid-point node; and a controller circuit coupled to the modular multi-phase inverter circuit, the controller circuit configured to operate the modular multi-phase inverter circuit at a frequency greater than about 20 KHz to generate the high frequency multi-phase power.

15. The system of claim 10 wherein a number of phases in the multi-phase power is three or a multiple of three, wherein the transmitter portion further comprises:

a modular multi-phase inverter circuit including a multi-leg H-Bridge circuit configured to generate high frequency multi-phase power, wherein each leg is coupled to a respective phase of the high frequency multi-phase power;

an AC filter network coupled to an AC side of the modular multi-phase inverter circuit and configured to couple to low frequency multi-phase power input to the transmitter portion of the multi-phase wireless power transfer system;

a plurality of transmitter coils each coupled to a respective leg of the multi-leg H-Bridge circuit to receive the high frequency multi-phase power and each connected to a common neutral return;

a capacitor network coupled across a DC side of the modular multi-phase inverter circuit and including a mid-point node configured to provide a symmetrical dc voltage relative to a voltage at the mid-point node; and a controller circuit coupled to the modular multi-phase inverter circuit, the controller circuit configured to operate the modular multi-phase inverter circuit at an inverter frequency of about 20 KHz to about 400 KHz to provide both power factor control and the high frequency multi-phase power.

16. The system of claim 15 wherein the controller circuit is configured to operate the modular multi-phase inverter circuit at a resonant frequency of the multi-phase wireless power transfer system that matches the inverter frequency.

17. The system of claim 10 wherein the transmitter portion includes further includes:

a multi-phase H-Bridge circuit including a number of legs and configured to generate high frequency multi-phase power, wherein each of the legs is coupled to a respective phase of the high frequency multi-phase power; and a controller circuit coupled to the multi-phase H-Bridge circuit, the controller circuit configured to operate the multi-phase H-Bridge circuit to provide each phase of the high frequency multi-phase power to be out-of-phase with one another.

18. The system of claim 10 further comprising:

a plurality of transmitter coils, wherein each transmitter coil is coupled to the transmitter portion to wirelessly transmit a separate phase of the multi-phase power to provide transmitted separate phases of the multi-phase power.

19. The system of claim 18 further comprising a receiver portion of the multi-phase power transfer system, wherein the receiver portion comprises:

a plurality of receiver coils, each configured to wirelessly receive a respective one of the transmitted separate phases of the multi-phase power to provide received separate phases of the multi-phase power; and at least one rectifier circuit, coupled to the plurality of receiver coils, and configured to provide dc power to the rack.

20. The system of claim 19 wherein the at least one rectifier circuit comprises a plurality of rectifier circuits, wherein each rectifier circuit is coupled to a respective one of the plurality of receiver coils to generate respective separate dc power to the rack.

21. The system of claim 19 wherein the at least one rectifier circuit comprises a plurality of rectifier circuits, wherein outputs of the plurality of rectifier circuits are coupled together to provide paralleled dc power to the rack.

22. The system of claim 10 wherein the transmitter portion is configured to couple to a branch circuit conductor to receive high voltage DC via the branch circuit.

23. A multi-phase wireless power receiver comprising:

a receiver portion of a multi-phase wireless power transfer system, the receiver portion associated with an electrical equipment rack that is configured to house a plurality of electrical components, the receiver portion configured to wirelessly receive multi-phase power at a power level that is configured to operate the plurality of electrical components; and a plurality of receiver coils, each configured to wirelessly receive a separate phase of the multi-phase power, wherein the receiver portion comprises:

at least one rectifier circuit, coupled to the plurality of receiver coils, and configured to generate dc power to the rack.

24. The receiver of claim 23 wherein the at least one rectifier circuit comprises a plurality of rectifier circuits, wherein each rectifier circuit is coupled to a respective one of the plurality of receiver coils to generate respective separate dc power for the rack.

25. The receiver of claim 23 wherein the at least one rectifier circuit comprises a plurality of rectifier circuits, wherein outputs of the plurality of rectifier circuits are coupled together to provide paralleled dc power to the rack.

26. The receiver of claim 23 wherein the receiver portion of the multi-phase wireless power transfer system is positioned adjacent to a predetermined gap across which the multi-phase power is received at a server rack coupled to the receiver portion of the multi-phase wireless power transfer system.

* * * * *